(12) United States Patent
Gammel

(10) Patent No.: US 8,074,081 B2
(45) Date of Patent: *Dec. 6, 2011

(54) METHOD FOR REPLACING CONTENTS OF A DATA STORAGE UNIT

(75) Inventor: Berndt Gammel, Markt Schwaben (DE)

(73) Assignee: Infineon Technologies AG (DE)

( * ) Notice: Subject to any disclaimer, the term of this patent is extended or adjusted under 35 U.S.C. 154(b) by 1115 days.

This patent is subject to a terminal disclaimer.

(21) Appl. No.: 10/966,847

(22) Filed: Oct. 15, 2004

(65) Prior Publication Data

US 2005/0094464 A1    May 5, 2005

Related U.S. Application Data

(63) Continuation of application No. PCT/EP03/03800, filed on Apr. 11, 2003.

(30) Foreign Application Priority Data

Apr. 15, 2002   (DE) ................... 102 16 611

(51) Int. Cl.
*G06F 11/30* (2006.01)
*G06F 12/14* (2006.01)

(52) U.S. Cl. .............. 713/194; 705/41; 705/50; 705/65; 705/66; 705/317; 713/159; 713/168; 713/184; 713/185; 713/189; 713/172; 713/193; 713/340; 380/37; 380/204; 380/207; 380/218; 380/252; 380/253; 380/254; 380/1; 365/222; 726/9; 726/20; 726/25

(58) Field of Classification Search ................... 713/193
See application file for complete search history.

(56) References Cited

U.S. PATENT DOCUMENTS

| | | | |
|---|---|---|---|
| 4,932,053 A | 6/1990 | Fruhauf et al. | |
| 5,568,632 A | 10/1996 | Nelson | |
| 5,974,507 A | 10/1999 | Arimilli et al. | |
| 6,240,489 B1 * | 5/2001 | Durham et al. | 711/136 |
| 6,253,223 B1 | 6/2001 | Sprunk | |
| 6,405,287 B1 * | 6/2002 | Lesartre | 711/128 |
| 6,986,052 B1 * | 1/2006 | Mittal | 713/190 |
| 7,587,044 B2 * | 9/2009 | Kocher et al. | 380/1 |
| 2005/0097153 A1 * | 5/2005 | Dirscherl et al. | 708/250 |

FOREIGN PATENT DOCUMENTS

DE    199 26 640 A1    12/2000

(Continued)

OTHER PUBLICATIONS

Smith A.; "Cache Memories"; ACM Computing Surveys, vol. 14, No. 3, Sep. 1982, pp. 473-530.

(Continued)

*Primary Examiner* — Nathan Flynn
*Assistant Examiner* — Bryan Wright
(74) *Attorney, Agent, or Firm* — Dickstein Shapiro LLP

(57) ABSTRACT

A data storage device includes a plurality of data storage units, a physical random number generator with a noise source based on a physical noise process, for generating a random number, and a replacer for selecting a data storage unit wherein data is to be stored, depending on the random number. Selecting, on the basis of genuine random numbers, data storage units and/or lines to be replaced in the cache.

8 Claims, 1 Drawing Sheet

FOREIGN PATENT DOCUMENTS

| | | |
|---|---|---|
| EP | 1 179 782 A2 | 2/2002 |
| GB | 2 333 652 A | 7/1999 |
| WO | WO-00/16182 A1 | 3/2000 |
| WO | WO-01/06374 A2 | 1/2001 |
| WO | WO-01/52069 A2 | 7/2001 |

OTHER PUBLICATIONS

Xu, J.;"A Novel Cache Architecture to Support Layer-Four Packet Classification at Memory Access Speeds"; IEEE INFOCOM 2000, Nineteenth Annual Joint Conference of the IEEE Computer and Communications Societies, Proceedings IEEE Tel Aviv, Israel, Mar. 26-30, 2000, pp. 1445-1454.

"Integrated Circuit Compatible Random Number Generator"; IBM Technical Disclosure Bulletin, vol. 30, No. 11, Apr. 1998, Armonk, NY, USA, pp. 333-335.

"Random Numbers Produced via A Technique Employing Both A White Noise Generator and the Data Encryption Algorithm"; IBM Technical Disclosure Bulletin, vol. 34, No. 7B, Dec. 1991, Armonk, NY, USA, pp. 316-318.

Karedla, R. et al.; "Caching Strategies to Improve Disk System Performance"; Computer, Mar. 1994, pp. 38-46.

* cited by examiner

METHOD FOR REPLACING CONTENTS OF A DATA STORAGE UNIT

CROSS-REFERENCE TO RELATED APPLICATION

This application is a continuation of copending International Application No. PCT/EP03/03800, filed Apr. 11, 2003, and is incorporated herein by reference in its entirety.

BACKGROUND OF THE INVENTION

1. Field of the Invention

The present invention relates to data storage devices, and in particular to secure operation of such data storage devices.

2. Description of Related Art

Modern attacks on data processing means processing data relevant in terms of security, and/or attacks on the algorithm and secret keys processed therein are effected via so-called leak information. Leak information includes, for example, current consumption of the data processing unit, electromagnetic radiation during operation of the data processing means, etc. Conclusions about information relevant in terms of security may be drawn from a statistical analysis of the physical signals picked up.

Here, the most common forms of attack are simple power analysis (SPA), differential power analysis (DPA) or high-order differential power analysis (HO-DPA).

Various methods have been employed to prevent these attacks, such as methods related to software engineering which comprise continuously altering the sequence of operations of the cryptographic algorithm or inserting redundant operations. Hereby, statistical evaluations, for example of the power profile or of the electromagnetic radiation, at least prevented or at least made much more difficult.

A disadvantage of this approach is the large-scale intervention in the respective software and the algorithms as well as the significant reduction in performance which results in most cases. A further known measure is to include additional current profile generators which overlay an additional stochastic current profile on the original current profile of the circuit, for example of the controller, etc. The benefit of this approach is doubtful, since in general it does not provide adequate protection against DPA or HO-DPA and additionally may lead to a significant increase in the current consumption of the data processing means.

A further known measure is to infiltrate random actions into the data processing unit. To this end, state machines are infiltrated with random command sequences and states so as to create a time-related desynchronization of the command flow of a cryptographic process. Thus it may be made more difficult to find trigger points in current profiles and to perform a current profile analysis by means of resynchronization in the course of time. The controller, which is referred to as "idle function generator", serves to infiltrate random sequences, for example into the processor pipeline of a CPU. Such a control typically comprises considerable complexity, since it must be ensured that the integrity of the data being processed and the integrity of the command flow are maintained despite the security measures. As an example, register or memory contents must not be overwritten by mistake. Of course, the causality of instructions must not be violated either, etc.

Modern data processing means include a CPU, a memory, such as a non-volatile memory and a volatile memory as well as a cache memory, which significantly contributes to increasing the calculating speed of a data processing means by providing fast memory access. Such powerful and fast storage systems typically contain multi-stage cache memories or buffers which temporarily hold areas of the main memory. Examples are instruction cache memories, data cache memories or translation lookaside buffers (TLBs), also referred to as address cache memories. Such data storage devices exist, in various embodiments, on each processor. Cache memories structured in an associative manner, or memories in general, hold a plurality of lines, i.e. data storage units, in which a data block from the main memory may be deposited in each case. Such a memory is also referred to as an n-way associative cache memory, n designating the number of data storage units. One of these n data storage units is selected to deposit a data block which is to be re-stored in the memory. Here, the data block previously deposited is displaced. The data block displaced must then be reloaded from the main memory when it is needed again.

Usually a so-called least recently used (LRU) algorithm is used for selecting the line into which a new data unit is to be written, since the best cache performance may typically be achieved by using such a replacement strategy.

A different, less time-consuming and costly known replacement strategy is the so-called random replacement strategy, wherein the data storage unit to be overwritten is randomly chosen. With a high amount of cache associativity and large-scale memories, the random replacement strategy may achieve nearly the same performance as an LRU strategy, which is considerably more time-consuming and costly to implement.

The random number generator required for the random replacement strategy is a pseudo random number generator based on a circuit comprised of linear feedback shift registers (LFSR). Such circuits comprising linear feedback shift registers are placed into a defined initial state by means of a so-called seed, with a deterministic sequence of random numbers being generated, starting from this defined initial state, which has an approximately random distribution, however. However, this sequence is deterministic in that it is repeated in an exact manner whenever the predetermined seed has been fed into the LFSR. If a different seed is fed in, this results in a different but also fully repeatable sequence of randomly appearing random numbers.

In view of the above-described attacks on cryptographic data processing means, such pseudo random number generators and/or the random replacement strategy based on these pseudo random number generators have the significant disadvantage that the program flow will always remain deterministic. In particular, a program would exhibit exactly the same behavior after each restart of the CPU. This represents a point of attack for power analysis attacks.

SUMMARY OF THE INVENTION

It is an object of the present invention to provide a secure concept for storing data.

In accordance with a first aspect, the present invention provides a data storage device, having: a plurality of data storage units; a physical random number generator with a noise source based on a physical noise process, for generating a random number; a pseudo random number generator for generating a pseudo random number; a combiner for using the random number and the pseudo random number so as to provide a driving signal depending on the random number and the pseudo random number; and a replacer for selecting a data storage unit wherein data is to be stored, depending on the random number, wherein the combiner is implemented to feed, when there is a new random number, the random number into the pseudo random number generator as a seed for re-initializing and to use a pseudo random number, which has been generated by the pseudo random number generator on the basis of the random number as a seed, as a driving signal for the replacer.

In accordance with a second aspect, the present invention provides a method for replacing contents of a data storage device having a plurality of data storage units, the method having the following steps: providing a random number dependent on a physical noise process; generating a pseudo random number with a pseudo random number generator; using the random number and the pseudo random number to provide a driving signal for a selection of a data storage unit depending on the random number and the pseudo random number; selecting a data storage unit from the plurality of data storage units in dependence of the physical random number, based on the driving signal; and storing data to be stored in the selected data storage unit, wherein in the step of using, when there is a new random number, the same is fed into the pseudo random number generator as a seed for re-initializing and a pseudo random number generated by the pseudo random number generator on the basis of the random number as a seed is used as the driving signal.

In accordance with a third aspect, the present invention provides a data storage device, having: a plurality of data storage units; a physical random number generator with a noise source based on a physical noise process, for generating a random number; and a replacer for selecting a data storage unit wherein data is to be stored, depending on the random number; wherein a mode controller is provided, wherein the mode controller is implemented to drive the replacer such that, within random time intervals, a replacement strategy due to a random number is deactivated, and, instead, a deterministic replacement strategy is used, or that the mode controller is implemented to obtain, via a random number line, a random number of the physical random number generator, and to switch, depending on the random number, between replacement strategies from a plurality of different deterministic replacement strategies for the replacer.

In accordance with a fourth aspect, the present invention provides a method for replacing contents of a data storage device having a plurality of data storage units, the method having the following steps: providing a random number dependent on a physical noise process; selecting a data storage unit from the plurality of data storage units in dependence of the physical random number; and storing data to be stored in the selected data storage unit, the method also having the following step: performing a mode control, wherein the step of performing controls the step of selecting such that, within random time intervals, a replacement strategy due to a random number is deactivated, and, instead, a deterministic replacement strategy is used in the step of selecting, or that the step of performing includes the step of obtaining a random number and the step of switching, depending on the random number obtained, between replacement strategies from a plurality of different deterministic replacement strategies for selecting a data storage unit.

The present invention is based on the findings that the benefits of the low-scale implementation of the random replacement strategy may be maintained without any software modification and/or without any expensive idle function generators for a data storage device handling data which are relevant in terms of security. This is done by employing, instead of or in addition to the pseudo random number generator, a physical random number generator, i.e. a random number generator with a noise source based on a physical noise process.

A replacement strategy based on a physical random number generator has the significant advantage that a randomization rather than a pseudo-randomization of the power profile of a data storage device and/or of a CPU comprising an inventive data storage device is indeed achieved.

A further advantage of the present invention is the fact that no expensive software interventions and/or no additional current consumption is introduced by the random replacement strategy on the basis of actual physical random numbers.

A further advantage of the present invention is the fact that there is an option to combine the physical random number generator with a pseudo random number generator, which typically provides random numbers faster than a physical random number generator. By merely combining the physical random numbers and the pseudo random numbers, a good randomization of the current profile may be achieved, for example by infiltrating an actual random number after a certain number of pseudo random numbers, or by continuing to use the pseudo random numbers to select cache data storage units to be replaced, the feedback shift registers used for the pseudo random number generator obtaining random numbers as a seed or as seeds. Thus the replacement sequence will not always exhibit the same behavior at a restart of a CPU, but its behavior will in fact vary even though the pseudo random number generators which are fast and easy to implement, in terms of circuit technology, are nevertheless used. However, the pseudo random number generators are now placed into a new initial state (seed state) at selectable intervals by the physical noise generator.

A further advantage of the present invention is the fact that the use of a random number generator for cache replacement entails a significant degree of flexibility by providing scaleable security. For calculations highly relevant in terms of security, a cache line replacement may be performed on the basis of random numbers, whereas a switch-over from random number replacement to a fully deterministic replacement strategy may be effected by means of a mode control means and in accordance with certain criteria for data which are less relevant in terms of security but for which still a certain level of security is required.

BRIEF DESCRIPTION OF THE DRAWINGS

Preferred embodiments of the present invention will be explained in more detail below with reference to the accompanying figures, wherein.

DESCRIPTION OF PREFERRED EMBODIMENTS

Figure 1:
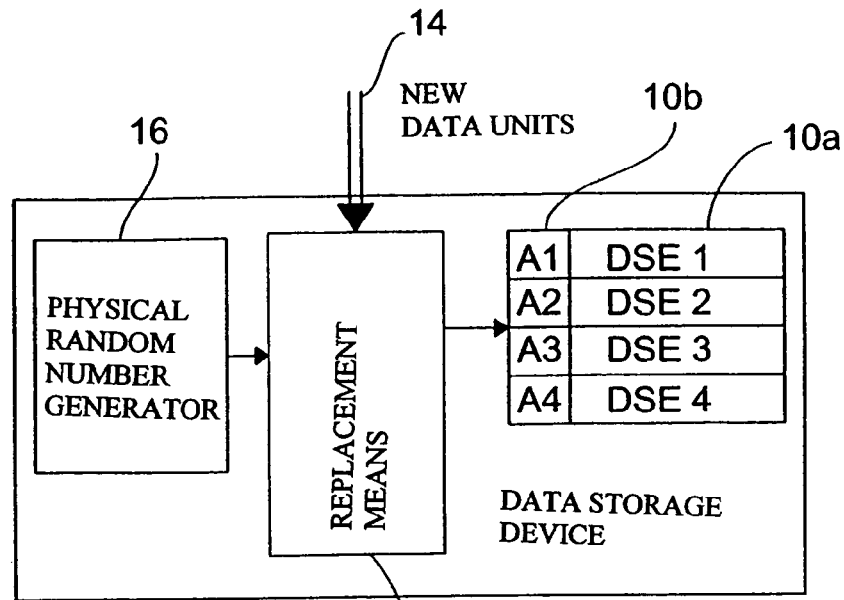
FIG. 1 shows a block diagram of an inventive secure data storage device.

The data storage device shown in FIG. 1 is used to ensure a secure, but at the same time efficient, de-correlation of the data and command flow in a modern microprocessor. The data storage device includes a plurality of data storage units $10a$ each having associated with them addresses $10b$. The selection of the data storage device is effected via an address selected by a replacement means 12 if a new data unit is to be written into a data storage unit via a data units line 14. The replacement means is driven by a physical random number generator 16 to effect a random replacement strategy on the basis of an actual physical random number rather than a pseudo random number.

The physical random number generator includes a noise source based on a physical noise process. Exemplary implementations consist in either directly evaluating the thermal noise of a resistor or in applying the thermal noise to a control input of a voltage-controlled oscillator so as to achieve a larger "randomness". Alternatively, the shot noise of a diode may be used as the physical noise process. Further physical noise processes have been known.

It shall be pointed out that random number generators including a noise source based on a physical noise process are present anyhow in cryptographic processors. Thus a data storage device belonging to such a cryptographic processor system need not even have a physical random number generator added to it since the latter is present anyhow. If the physical random number generator is to be used as the only basis, the only modification required is to combine the physical random number generator of the cryptoprocessor system with the replacement means 12.

Figure 2:
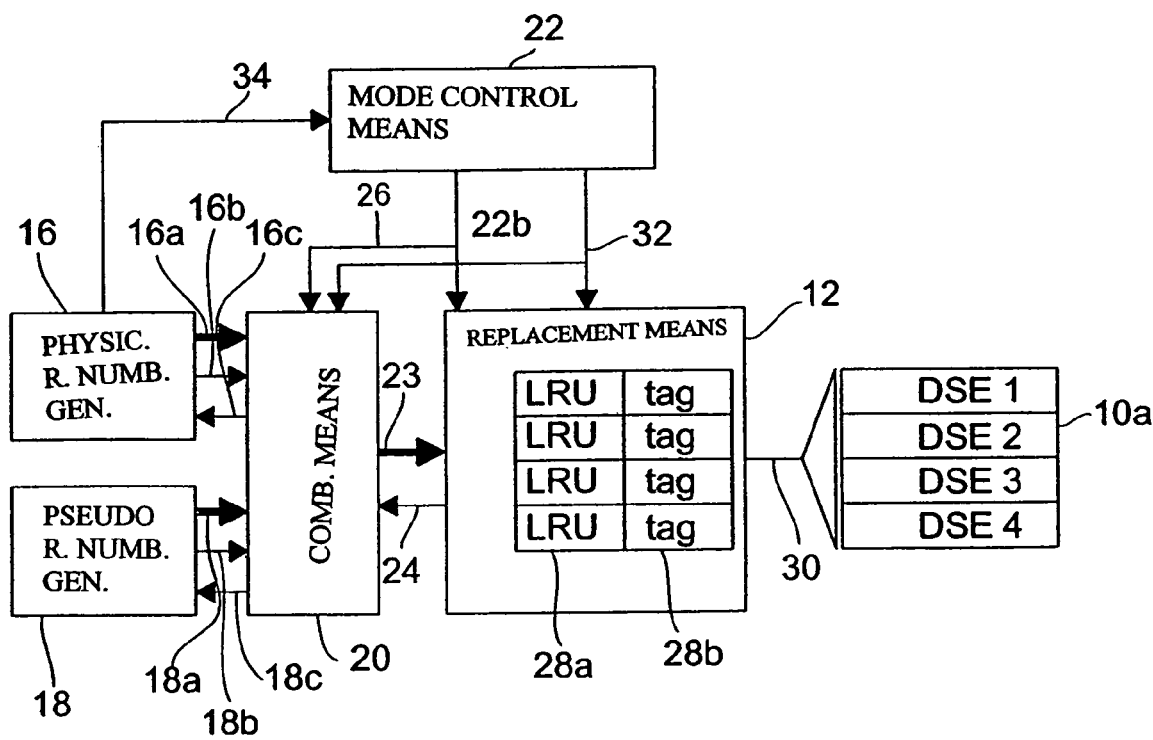
FIG. 2 shows a data storage device in accordance with a preferred embodiment of the present invention.

FIG. 2 shows a preferred embodiment of a secure data storage device in accordance with the present invention. In addition to the data storage units 10a, the replacement means 12 and the physical random number generator 16, a pseudo random number generator 18 is further provided which is connected to a combination means 20, as is the physical random number generator 16. The replacement means 12 is now no longer driven directly by the physical random number generator but by means of a driving signal 22 created in the combination means 20 using the physical random number generator 16 and the pseudo random number generator 18. Also coupled to the replacement means 12 is a mode control means 22 which will be explained in more detail below. The physical random number generator provides the combination means 20 with random numbers via a line 16a. The physical random number generator signals its readiness to the combination means 20 via a line 16b referred to as RN Valid. The combination means 20 may act upon the physical random number generator 16 via a control line 16c.

The pseudo random number generator 18 provides its pseudo random numbers to the combination means 20 via a line 18a. The pseudo random number generator 18 is further connected to the combination means 20 via a PRN Valid line 18b, which combination means 20 may in turn act upon the pseudo random number generator 18 via a control line 18c. As has been explained, the combination means 20 provides the replacement means 12 with a sequence of driving signals on the line 22b, in dependence of which signals the replacement means 12 selects data storage units to be overwritten by a current value to be written. The replacement means 12 may act upon the combination means 20 via a line 24, for example to request one or several random numbers and/or driving signals.

The mode control means 22 accesses the combination means 20 and the replacement means 12 via a mode line 26 so as to switch, in dependence on external situations, such as particular program sections or particular security stages required, from a randomized replacement strategy based on the physical random number generator 16 to a deterministic replacement strategy either solely based on the pseudo random number generator or using alternative known replacement strategies.

The replacement means 12 includes LRU information 28a for each data storage means so as to be able to establish which is the data storage unit that has been out of use for the longest time, so as to overwrite the data storage unit which has been out of use for the longest time by the new data storage unit on the basis of the LRU information 28a if a new set of data is to be stored. In a preferred embodiment implemented for switching to a deterministic memory replacement, the replacement means 12 holds the TAG Information 28b for each data storage unit to provide associative data storage access. Access to the data storage units from the replacement means 12 is effected by means of an address select line 30 so as to make an address selection for a replacement. In addition, the mode control means 22 has a further output line 32 so as to not only set the replacement mode strategy but also to effect a time interval control for switching from one strategy to another.

It is in various ways that the combination means 20 may combine physical random numbers from the random number generator 16 with pseudo random numbers from the pseudo random number generator 18. Generally, pseudo random number generators based on feedback shift registers are able to create a fast sequence of pseudo random numbers, whereas physical random number generators are generally slower, so that for certain, very fast applications, the physical random number generator is too slow if it is to be power-saving and must not occupy but a small area. In such a case, the combination means 20 may be implemented to directly use a physical random number for address selection after a specific number n of pseudo random numbers, for example.

In an alternative embodiment of the present invention the combination means 20 is implemented to always use pseudo random numbers from the pseudo random number generator 18 for address selection. Here, the physical random numbers are used to re-"seed" the pseudo random number generator. This means that whenever a new physical random number is present, the physical random number generator activates the line 16b to feed this random number to the combination means 20, which in turn feeds the same to the random number generator 18 via the line 18c, so that the feedback shift registers are placed into an initial state dictated by the random number. By constantly re-initializing the pseudo random number generator, a randomized current profile is achieved which, in addition, is not always the same at a re-start of the system, but which is the same only for the first few cache replacements up to the first re-initialization if a first physical random number is present, but which is then random and is thus not detectable by the attacks described.

The combination of a pseudo random number generator with a physical random number generator thus has the benefit that random numbers may be generated sufficiently fast, since physical random number generators on their own generally are not able to generate a sufficient amount of random bits at a sufficiently high clock rate as is required in fast processors, and it further has the benefit that nevertheless a secure de-correlation of the command and/or data flow is achieved, since the random number generator provides non-predictable random numbers used for modifying the random sequence of the pseudo random number generator.

In addition, the mode control means 22 is implemented to switch over the replacement means 12 and the combination means 20 during operation ("on the fly"), to be precise to switch between one or several deterministic replacement strategies and the non-deterministic strategy on the basis of the physical random numbers. The deterministic strategy may include, for example, LRU, round robin, pseudo random replacement or any other known replacement strategy.

Switching by means of the mode control means 22 is advantageous in that a more favorable deterministic replacement strategy may be chosen in programs or program sections which are not relevant in terms of security, where power attacks are insignificant. A deterministic strategy is important even if guaranteed and predictable run times are required in time-critical program sections.

In a further embodiment of the invention, the replacement means is driven via the control line 32 so as to keep switching between different deterministic replacement strategies, to be precise depending on a random number of the physical random number generator which is fed to the mode control means via a random number control line 34. Therefore it is not always necessary to employ a random replacement strategy on the basis of genuine random numbers, but it is also possible to switch between various deterministic replacement strategies, this switching being based on genuine physical random numbers, such that, in addition, a randomization of the behavior of the data storage device is achieved to ward off power analyses. To this end, the deterministic strategy is suspended at regular or alternative, non-predictable time intervals depending on the physical random numbers, and instead, a random line is chosen for the replacement, or one deterministic strategy is replaced by another deterministic strategy. The correlation of the command flow is thus guaranteed, on the one hand, by the random replacement, and, on the other hand, by the random interval. Use is always made of the physical random numbers of the physical random number generator 16, whereby the non-predictability of the data storage device's behavior is ensured.

In a further embodiment of the present invention, the mode control means 22 is further implemented to set the switching interval, or the infiltration interval, according to which randomly chosen lines are replaced. In this manner the level of security may be set dynamically in relation to the run time by increasing or decreasing the duration of the interval with which randomly chosen lines are "infiltrated".

As has been set forth, the inventive concept is advantageous in that a time-related de-correlation of the cache replacement strategy is achieved in a CPU pipeline control without using idle function generators. The inventive concept is characterized by small-scale implementation expense and by a negligible decrease in performance. A secure and efficient cache replacement strategy is achieved in particular in an associative cache memory with dynamic switch-over from a deterministic replacement strategy, for example round robin, to a non-deterministic strategy using physical random numbers and, if need be, additionally using pseudo random numbers.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A data storage device, comprising:
   a plurality of data storage units;
   a physical random number generator with a noise source based on a physical noise process, implemented to generate physical random numbers;
   a pseudo random number generator implemented to generate pseudo random numbers;
   a combiner implemented to combine the physical random numbers and the pseudo random numbers; and
   a replacer implemented to select one of the data storage units, in which data is to be stored, depending on a sequence of driving signals,
   wherein the combiner is implemented to feed, when there is a new physical random number, the new physical random number into the pseudo random number generator as a seed for re-initializing, and
   wherein the combiner is implemented to generate the sequence of driving signals using one of the pseudo random numbers, which has been generated by the pseudo random number generator based on the new physical random number as a seed; and
   a mode controller implemented to access the combiner or the replacer via a mode line so as to switch, within a predetermined time interval, from a random non-deterministic replacement strategy used in selecting a data storage unit, which is based on the physical random numbers from the physical random number generator to a deterministic replacement strategy used in selecting a data storage unit, which is either solely based on the pseudo random numbers or is an alternative deterministic replacement strategy,
   wherein the mode controller is implemented to bring about the deterministic replacement strategy when calculations in program sections which are less relevant in terms of security are to be performed in a processor coupled to the data storage device or when guaranteed or predictable run times are required for calculations in program sections by the processor, and to bring about the random non-deterministic replacement strategy when calculations in program sections which are more relevant in terms of security are to be performed in the processor coupled to the data storage device.

2. The data storage device as claimed in claim 1, wherein the noise source of the physical random number generator comprises a shot-noise source or a source for thermal noise.

3. The data storage device as claimed in claim 1, wherein the replacer is implemented to select a sequence of addresses, and
   wherein the combiner is implemented to create driving signals for the sequence of addresses, such that one of the driving signals depends on the physical random number and a different one of the driving signals depends on the pseudo random number.

4. The data storage device as claimed in claim 1,
   wherein the mode controller is implemented to bring about a switching of the replacement strategy at regular or random intervals.

5. The data storage device as claimed in claim 4, wherein a random time interval is determinable by the mode controller depending on the physical random number of the physical random number generator.

6. The data storage device as claimed in claim 1, which is implemented as an associative cache memory.

7. A method for replacing contents of a data storage device comprising a plurality of data storage units, the method comprising:
   providing physical random numbers dependent on a physical noise process using a physical random number generator;
   generating pseudo random numbers with a pseudo random number generator;
   using the physical random numbers and the pseudo random numbers to generate a sequence of driving signals for a selection of a data storage unit depending on the physical random numbers and the pseudo random numbers;
   selecting a data storage unit from the plurality of data storage units in dependence on the physical random numbers, depending on the sequence of driving signals; and
   storing data to be stored in the selected data storage unit, wherein, in using the physical random numbers and the pseudo random numbers, when there is a new physical random number, the new physical random number is fed into the pseudo random number generator as a seed for re-initializing, wherein, in generating the sequence of driving signals, one of the pseudo random numbers generated by the pseudo random number generator based on the new physical random number as a seed is used, wherein a mode controller switches, within a predetermined time interval, from a random non-deterministic replacement strategy used in selecting a data storage unit, which is based on the physical random numbers from the physical random number generator to a deterministic replacement strategy used in selecting a data storage unit, which is either solely based on the pseudo random numbers or is an alternative deterministic replacement strategy, and wherein the mode controller is implemented to bring about the deterministic replacement strategy when calculations in program sections which are less-relevant in terms of security are to be performed in the processor coupled to the data storage device or when non-guaranteed or non-predictable run times are allowable for calculations in program sections by the processor, and to bring about the random non-deterministic replacement strategy when calculations in program sections which are more relevant in terms of security are to be performed in the processor coupled to the data storage device.

8. The data storage device as claimed in claim 1, wherein the deterministic replacement strategy comprises a least-recently used replacement strategy, a round robin replacement strategy or a replacement strategy being solely based on pseudo random numbers and not being based on physical random numbers.

\* \* \* \* \*